I. James,
Hay Press.
No. 1,954. Reissued May 9, 1865.
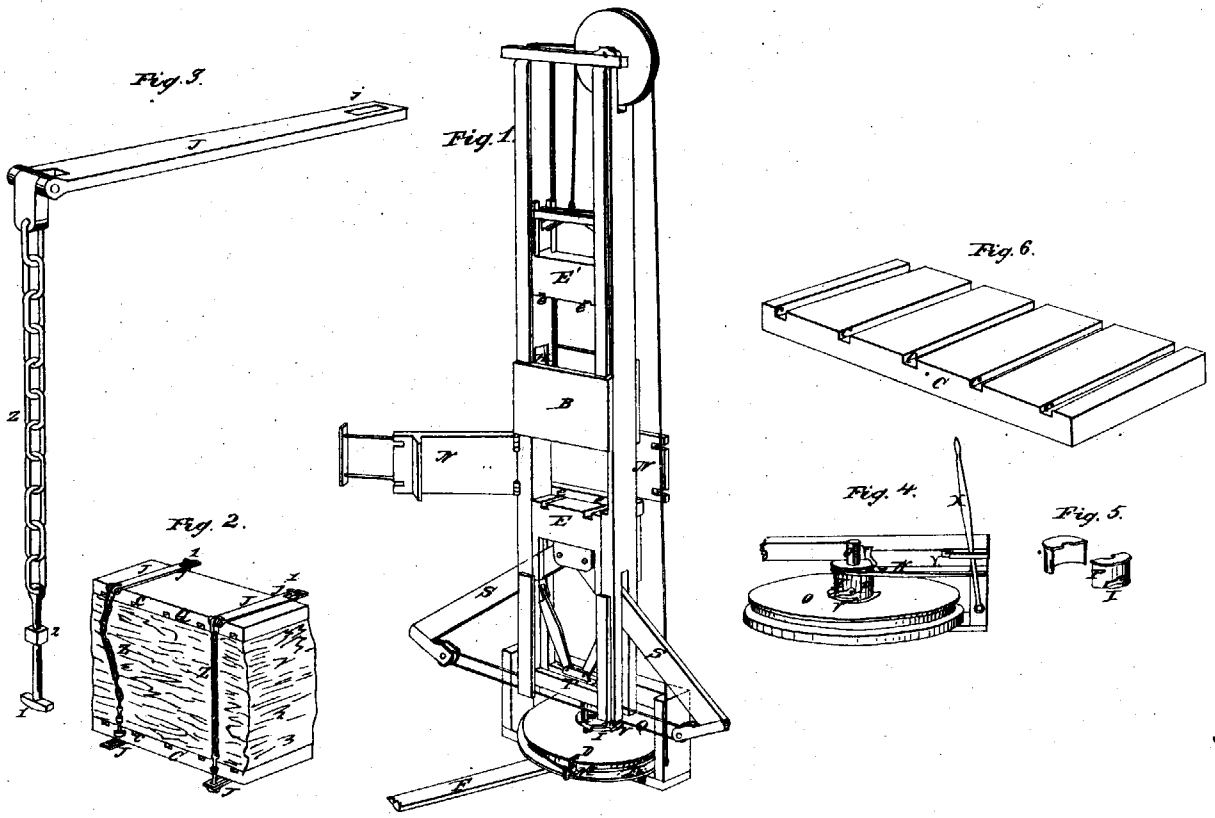
Witnesses:
Charles E. Fisher
Edward W. Knight
Inventor:
Ira James
per W. Knight Pro
Attorney
AM. PHOTO-LITHO. CO. N.Y. (OSBORNE'S PROCESS.)

UNITED STATES PATENT OFFICE.

IRA JAMES, OF MATTOON, ILLINOIS.

IMPROVEMENT IN HAY AND COTTON PRESSES.

Specification forming part of Letters Patent No. 41,625, dated February 16, 1864; Reissue No. 1,954, dated May 9, 1865.

*To all whom it may concern:*

Be it known that I, IRA JAMES, of Mattoon, in the county of Coles and State of Illinois, have invented new and useful Improvements in Hay-Presses; and I do hereby declare that the following is a full, clear, and exact description thereof, which will enable others skilled in the art to make and use the same, reference being had to the accompanying drawings, forming part of this specification, in which—

Figure 1 is a perspective view of a vertical hay-press; Fig. 2, a bale clamped and removed ready for binding or hooping. Fig. 3, a clamp bar and its appendages; Fig. 4, a detached view of my capstan; Fig. 5, my sleeve in sectional perspective; Fig. 6, the lower batten on an enlarged scale.

My invention relates to, first, devices for increasing the efficiency of that class of vertical hay-presses in which the hay is reduced in bulk before pressing by means of a beater; second, to the binding or hooping of the bale outside of the press, so that the binding or hooping process will not interfere with or retard the pressing operation. The frame A, box B, capstan O, trip-iron K, dog D, slide-head M, sweep F, and doors N N′ may be substantially such as now used in the Hewitt and other vertical presses. The follower E and beater E′ are grooved, as shown at *e*, to receive my clamps, hereinafter described. The shaft *o* of the capstan O in my press carries a sleeve, B, to which is attached a cord or chain, Q, which is rove through pulleys *a* in the toggles S, whose lower extremities are fulcrumed to rail T of the frame, their upper ends being hinged to the follower E. A pawl pivoted to the sleeve P engages, when desired, in ratchet V on capstan and compels the sleeve to rotate with the capstan.

To enable the operator to hold the sleeve stationary when desired, I have applied a brake-movement consisting of a presser-band, W, lever X, and yoke Y.

Having thus described my combination for pressing the hay, I now proceed to explain my mode of enabling the removal of the pressed hay for the purpose of hooping outside of the press.

C is the lower, and G is the upper, of two battens, having grooves *c*, corresponding in number with the bale-hoops.

J are four bars, each slotted at one end, as shown at *j*, and having appended to the other end a chain, Z, which terminates in a T-head, 1, having a square shank, 2.

Operation: The follower E being down, the batten C is placed upon it, and the doors N N′ are closed. The hay being then fed in at the top of the box B, about five blows of the beater E′ ordinarily suffices to compress the hay sufficiently for my pressing action. This consumes from three to four minutes. The top board or batten, G, is then placed in the box and descends with the beater at its final stroke. The operation down to this point is substantially the same as that commonly employed in vertical-beater presses. The dog D is now removed, and the pawl I is engaged in the ratchet V of the capstan O. The team being then started in the same direction as for beating, the capstan O begins to draw on the cords or chains Q, acting to draw the toggles S together, to elevate the follower E with a progressive power for the space of about five feet, and so as to compress the hay into a thickness of about twenty-four inches. The doors N N′ being then thrown open, I remove the compressed hay from the press by the following means: The four bars J being slipped into the grooves *e* in the follower and beater, the T-heads 1 are engaged in the slots *j*. The sleeve P being then held fast by means of the brake X, the dog D is withdrawn, and the pawl I disengaged from the ratchet V. The brake X being now relaxed, allows the follower E to descend and relieve the bale, which may now be removed for hooping outside of the press. The bale having been hooped, the clamps are disengaged by a quarter-turn of the T-heads by means of a wrench. The descent of the follower E′ and of the toggles S is accomplished without any rotation of the capstan O, which remains perfectly stationary until the beating is resumed. The dog D being now replaced, the above-described operation is repeated, the hooping of the bale not delaying the pressing action.

I claim as new and of my invention, and desire to secure by Letters Patent—

1. The provision in a vertically-acting beater hay-press, of sleeve P, ratchet and brake movements W and W X, and pulley and toggle movements *a* S T, the whole being combined and operated substantially as set forth.

2. The employment or use of clamps, so constructed and arranged that the hay after being compressed may be removed from the press and retained in its compacted or compressed state, and the bale bound or hooped outside of the press, substantially as set forth.

IRA JAMES.

Witnesses:

W. W. CRADDOCKS,

FRANCIS A. ALLISON.